INVENTOR.
Arthur W. Daniels &
Joseph P. Murtaugh
By Louis Robertson
Att'y.

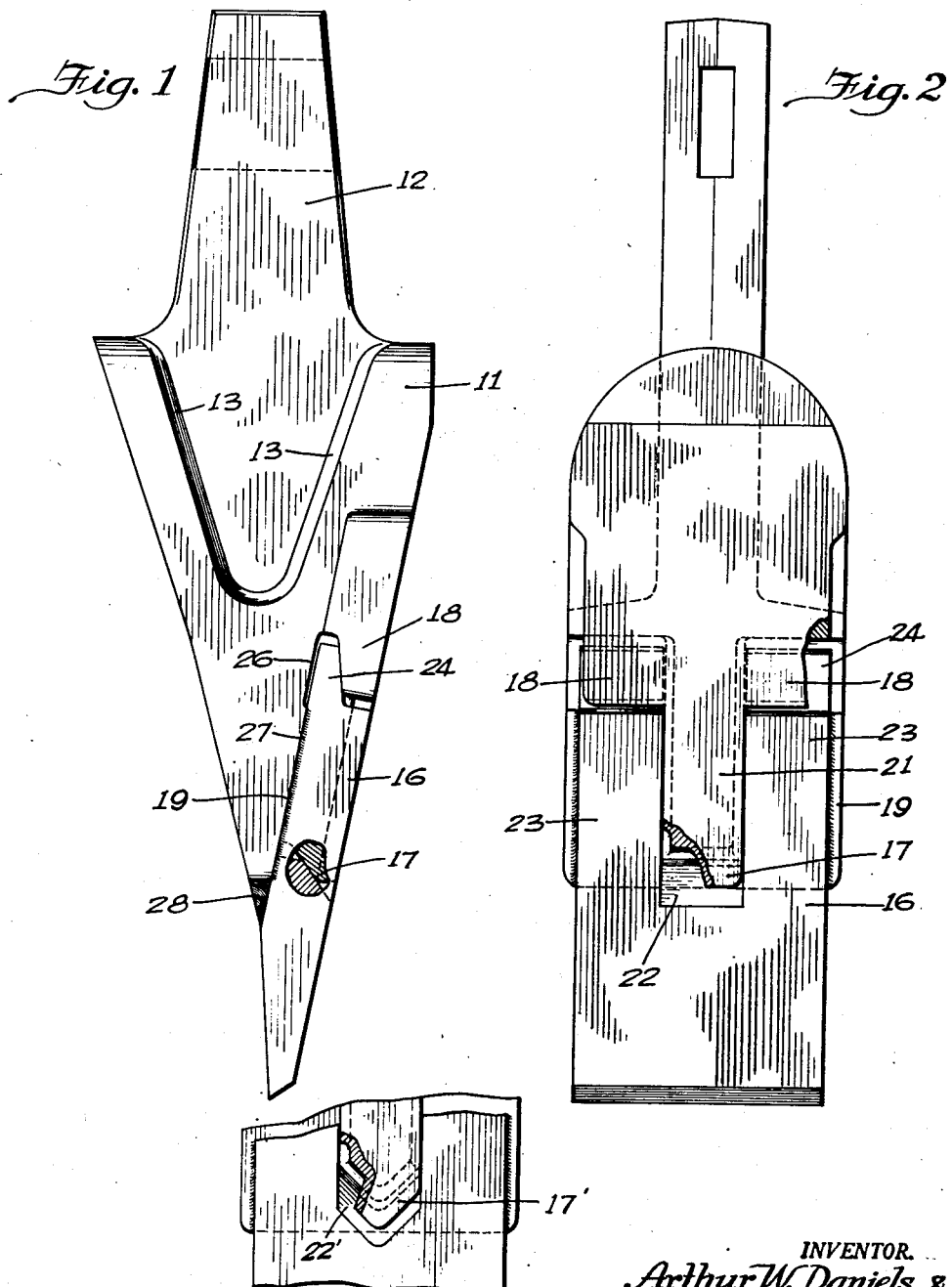

Patented Apr. 29, 1947

2,419,677

UNITED STATES PATENT OFFICE 2,419,677

EXCAVATING TOOTH

Arthur W. Daniels, Cedar Rapids, Iowa, and Joseph P. Murtaugh, Oak Park, Ill.

Application February 10, 1945, Serial No. 577,222

11 Claims. (Cl. 37—142)

In excavating implements such as steam shovels, drag lines, buckets and the like, the teeth wear away with surprising rapidity. As a result, the replacement of the teeth is an important factor in the cost of operation.

In the past a great deal of effort has been devoted toward reducing this cost. Many inventions have been used commercially and many more patented for facilitating the replacement of the teeth or of the points of the teeth. In some instances the replaceable part has been secured by wedge pins or other mechanical means and in other instances by welding.

Welding has various advantages and welding equipment is usually at hand. One advantage is in permitting the use of the simplest and smallest replacement parts, as compared with other means of securing in which a substantial portion of the replaceable part must be specially constructed for coaction with the securing means. However, welded points have heretofore given considerable trouble due to the difficulty of making the weld strong enough to withstand the loads imposed upon it.

According to the present invention, these difficulties are overcome and a thoroughly practical welded point is provided. An important factor in accomplishing this is in the provision of a simple form of interlock between the replaceable point and the remainder of the tooth such that the interlock takes the main load applied to the point and no substantial load is ever applied to the weld in the form of a tensile force. Such load as is applied to the weld is either a compressive force or a shear force each of which is resisted by a weld with ease.

In one form of the invention the parts are so proportioned that a single die may be used for various sizes of the replaceable points. This results in a very great economy in manufacture, saving not only the die costs of the various smaller sizes, but also permitting economies due to quantity production from one die. By making two straight cuts parallel to the sides of the largest point, the point is converted from a wide, heavy-edged point to a relatively narrow point with thinner edges.

In addition both this form and other forms of the invention may have a self-centering action which protects the weld somewhat against forces exerted laterally.

Additional objects and advantageous of the invention will be apparent from the following description and from the drawings in which:

Figure 1 is a side view partly broken away of one preferred form of the invention chosen for illustration;

Fig. 2 is a plan view of the tooth shown in Fig. 1 also partly broken away;

Fig. 3 is a fragmentary view similar to Fig. 2 but showing a modification of the invention;

Fig. 10 is a plan view of the replaceable point therefor, partly broken away, and Figs. 11 and 12 are longitudinal sectional and end views respectively, of the point in Fig. 10, the former being taken along the line 11—11 thereof;

Figs. 13 and 14 show the manner in which the large size tooth of Figs. 10 to 12 can be cut down by straight parallel cuts with a torch to fit a smaller sized tooth body.

Figure 4:
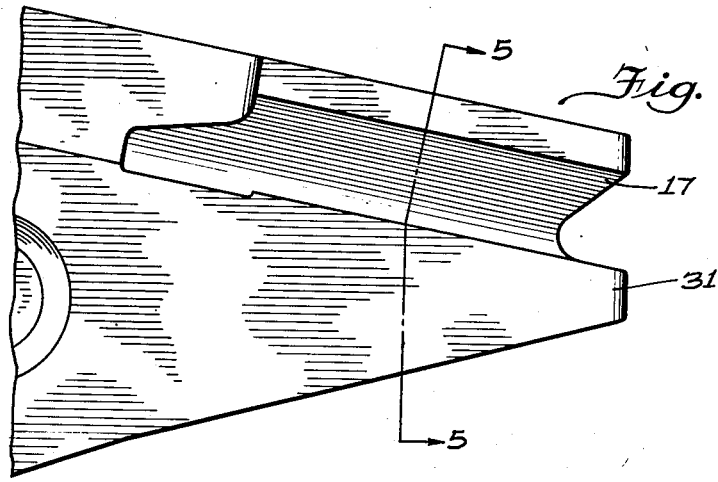
Fig. 4 is a fragmentary side elevational view of the tooth body shown in Figs. 1 and 2.

Although the law requires a full and exact description of at least one form of the invention such as that which follows, it is, of course, the purpose of a patent to cover each new inventive concept therein no matter how it may be disguised by variations in form or additions of further improvements; and the appended claims are intended to accomplish this purpose by particularly pointing out the parts, improvements, or combinations in which the inventive concepts are found.

In many respects all of the illustrated forms of the invention are similar and, therefore, a description of the form shown in Figs. 1, 2, 4, and 5 will serve to some extent for all forms. In this form the tooth body 11 is illustrated in the preferred form. However, it may be found to have no particular bearing on the present invention and, therefore, will not be minutely described. It may be mentioned, however, that it is provided with a securing shank 12 and with forwardly and inwardly converging faces 13 which bear on corresponding sloping faces of the base or nose portion to which the tooth is secured. This form of tooth fits very firmly and securely onto the base in the manner described in this paragraph as disclosed in our prior Patent #2,256,488.

The present invention is concerned with the replaceable point 16 and the structure and method of securing the same. According to this invention, the tooth body 11 is provided with a forward overhanging portion or cleat 17 and rearward overhanging portions or cleats 18 both of which face somewhat toward a seat 19. It will be observed that the rearward overhanging portions 18 are spaced substantially rearwardly from the forward overhanging portion 17 and are positioned to either side thereof. In effect, therefore, the forward overhanging portion 17 is at the front end of a central tongue or rib 21 formed by the tooth body 11.

The replaceable point 16 is provided with a central tapered portion 22 adapted to fit under portion 17. At each side thereof is a leg 23 terminating in a tapered portion 24 adapted to fit under the overhanging portions 18.

The seat 19 is preferably hollowed out slightly at 26 so that the interaction between portions 18 and 24 will insure some contact between portions 17 and 22. The replaceable point is driven into place with a hammer or a sledge.

Thereafter the replaceable point is welded in place as indicated by the welding marks 27, and any gaps are filled in as indicated at 28. If there should be any space between the front of the seat 19 and the replaceable point 16, the welding metal will flow slightly into this space so to take up any force in that direction in a compressional manner.

All the other forces on the welds are applied either in a compressional manner or in a shearing manner in the weld so that there is no danger of pulling it loose.

In some respects the replaceable point might be said to be restrained by longitudinally-spaced V-type engagements. Thus the overhanging portion 17 forms a V with the seat as does the overhanging portion 24. In the case of the V formed in part by the overhang 24, the other part of the V is spaced somewhat therefrom by the recess 26. As a matter of fact, the replaceable point is likely to bear on the seat 19 only at a high portion thereof intermediately the overhanging portions 17 and 24.

Figure 6:
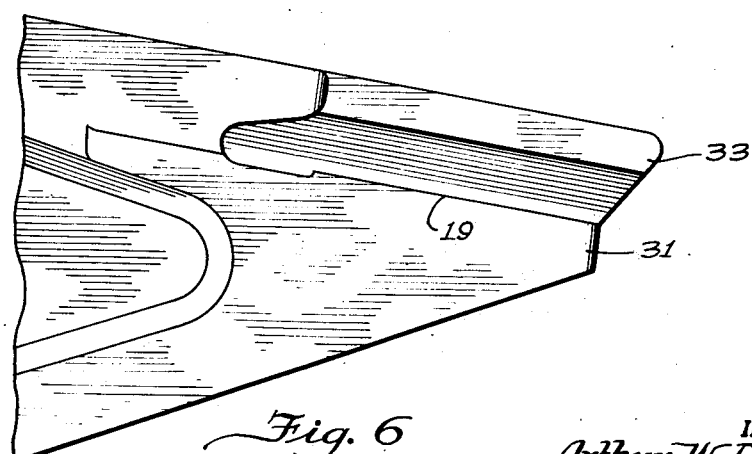
Fig. 6 is a view similar to Fig. 4, but showing a modified form of the invention.
Figure 7:
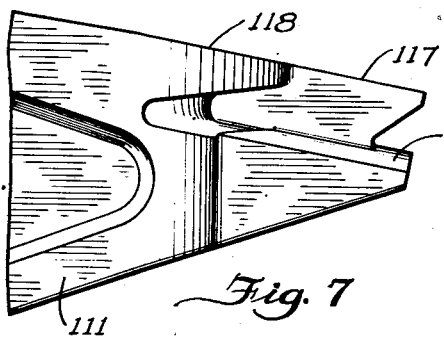
Figs. 7 to 14 are views of a modification of the inventions, Figs. 7, 8, and 9 being side, end and plan views of the body member of the tooth.
Figure 8:
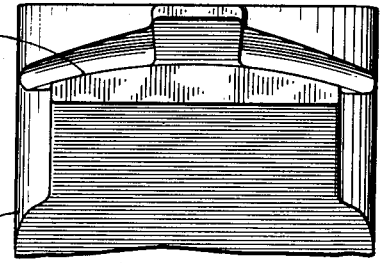

It will be observed from Fig. 4 that in this form of the invention, the overhanging portion 17 does not project ahead of the tip 31 of the body portion. This is advantageous because it permits using a cutting torch to cut through the weld 28 and through the replaceable point in alignment therewith in removing a worn point for replacement. However, this is not an essential feature and as seen in Fig. 6 the overhanging portion 33 projects ahead of the tip 31. In this instance it will be observed that the V formed in part by the overhang 33 has its other half formed by the seat 19, spaced rearwardly of the overhang 33.

Figure 5:
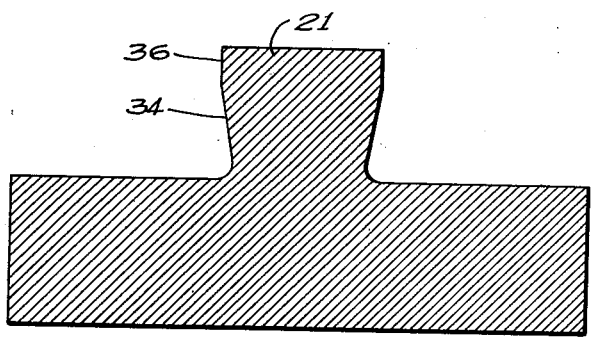
Fig. 5 is a sectional view taken approximately on the line 5—5 of Fig. 4.

From Fig. 5 it will be noted that the tongue or rib 21 is preferably recessed along the lower part of its length as seen at 34 so as to facilitate reasonably close fitting of the parts along the bearing surface 36 and so that the fillet at the base of the recess 34 will not need to be matched by the replaceable point.

In Fig. 3 has been shown a slight modification in which the overhang 17' and the corresponding tapered portion 22' are given a double V contour so that, in addition to holding the point against the seat 19, they will hold the point centered laterally at this position. This will relieve the welding of any strain due to lateral forces, or at least reduce such forces.

Figure 9:
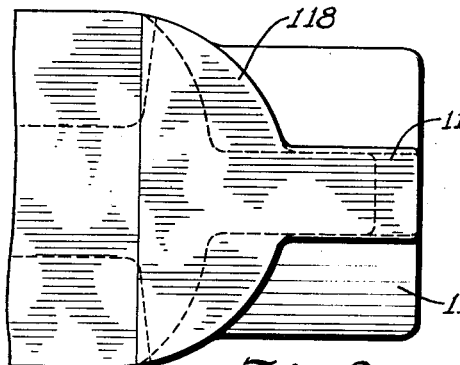

It will be observed from Fig. 2 that the replaceable point 16 is slightly narrower than the seat 19 with the result that an angular area is formed along the junction of the seat and the replaceable point 16. This not only facilitates welding but also enables the welding to resist lateral forces by a shear action so that there is no danger that the welding will be torn loose. Of course, a similar result can be obtained by making the replaceable point slightly wider than the seat as in Figs. 9 and 10. This has the advantage of protecting the seat from wear along the sides.

The form of the invention shown in Figs. 7 to 14 has some important advantages over the forms shown in Figs. 1 to 6, the advantages being especially important when points having a variety of sizes are to be provided for fitting different tooth body portions. With different widths of teeth, such as are used on different sizes of buckets, it is desirable to vary the point member not only as to its width, but also as to its average thickness and its length. In short the large buckets require a tooth which is not merely wider, but which is generally heavier. It might seem that this would require a separate die or set of dies for each size. According to the present invention, however, this is avoided by a very special shaping of the point member so that die means need only be provided for the largest size. The saving in die cost is indicated by the fact that there are nine different sizes in the three-inch to five-inch range. Furthermore, the forging costs are much lower on a quantity basis with one size than when the total quantity must be divided between nine sizes so that there is no real quantity production in any one size.

In Figs. 7 to 14 numerals similar to those used in Figs. 1 to 6 are used except that they are preceded by the digit "1." The body 111 and the point 116 are formed with interfitted curved surfaces both along the seat portion 119 and the cleat and end portions 118 and 124. The transverse curvature along the bottom of the point 116 results in providing a much thicker point along the side edges of the point than near the center portion as is perhaps seen best in Figs. 12 and 14. The curved end portions 124 result in having the point considerably longer along the side edges than near the center or adjacent the tongue 117. The result is that the large size point 116 shown in Fig. 10 can be cut by a torch along the lines 161 to produce a point of the proper proportions for a smaller sized tooth.

Figure 10:
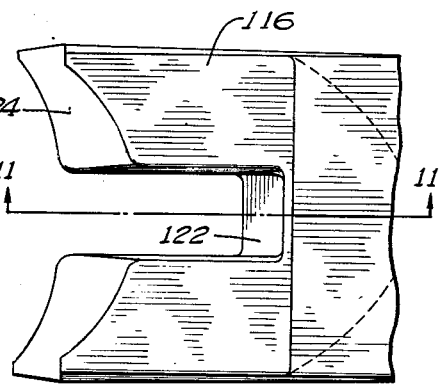
Figure 12:
Figure 11:
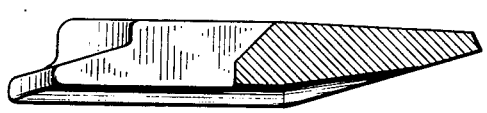
Figure 13:
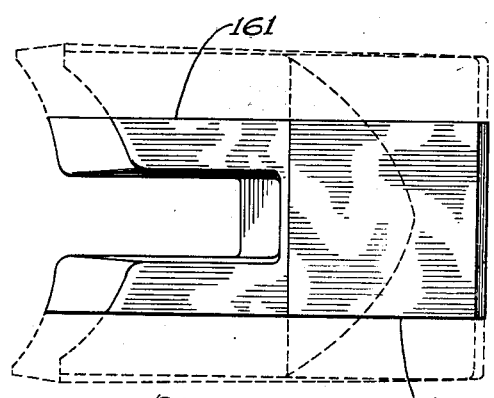
Figure 14:

For example, the five-inch point represented by Fig. 10 is 1 19/64 of an inch thick at the outer edges, while the three-inch point shown in full lines in Fig. 13 is only one inch thick at its outer edges. The curvature likewise provides suitable variations for the intermediate sizes. The length of the point is likewise automatically varied for the different sizes by cutting to different widths.

It may be surprising, but even aside from the die costs, it is cheaper to make a large quantity of points of the large size and cut them down to the different sizes, than to make small quantities of the different sizes. This partly is because of the economy with which they may be cut down. The points are mounted on an automatic burning machine equipped with two torches. In this way a point can be cut to size in about ½ a minute at a cost of about 2 cents. Since this is only in the neighborhood of 1% of the total cost, it will be understood that it is easy for this to be much more than offset by quantity production savings.

There are other advantages in the shape shown in Figs. 7 to 14. The curvature gives increased bearing surface for a given width of the point.

More uniform wear at the tip of the point rearwardly results from the fact that the point is thicker along the sides where the greatest amount of wear normally occurs. In addition the coaction between the curved seat and the cleats produces somewhat of a self-centering action to help the welds withstand lateral forces.

Of course, the curved surfaces could be replaced by flat surfaces angularly disposed with respect to one another if desired. The curvature approximately as shown is preferred, however, because it gives approximately those gradations between different widths which at present are believed to be ideal. The flat surfaces might have some advantage, however, in greater self-centering action, although to a large extent this can be accomplished with curved surfaces by providing a little clearance between the point and the seat along the longitudinal centerline of the point. This will ensure engagement between the point and the seat along surface portions which are sloping oppositely. In other words, for self-centering action, it is desirable that the point engage the tooth at laterally spaced points where the surfaces of one or both of the members slope oppositely, either both outwardly and downwardly or both outwardly and upwardly. To provide the automatic proportioning for different sizes, and for other reasons, the outward and downward slope is preferred, as illustrated.

The V shape shown in Fig. 3 can be provided for the interfitting faces of the forward cleat 117 and surface 122 of the replacement point 116.

The tooth body 11 or 111, or "adapter" as it may be called, may be made of any good grade of cast steel, such as manganese or alloy steel heat-treated. The point is made of high carbon steels or alloy steels such as chrome nickel of chrome nickel vanadium, or any rolled or forged steel that may be heat-treated to secure the proper strength and hardness. The tooth body is preferably cast, while the tooth point is preferably forged.

From the foregoing it is seen that a tooth for excavating implements or the like has been provided in which a simply shaped, replaceable point is held mainly by longitudinally spaced cleats or V engagements, together with welding which serves mainly to hold the replaceable point against the cleats, and is so disposed that it takes in a compressive or shear manner such forces as the welding must withstand. Thus, a thoroughly satisfactory welded, replaceable point construction is provided, one in which relatively little metal is expended on securing means and in which the structure is simple enough to permit forging the point if desired. Furthermore, in the preferred form of the invention shown in Figs. 7 to 14 die means need only be provided for forging the largest size of point. The different sizes with their various proportions suitably varied being easily formed from the large size by two parallel cuts.

We claim:

1. A tooth for excavating implements or the like including a tooth body having a seat thereon to receive a replaceable point, an overhanging portion centrally disposed laterally of said seat, and a pair of additional overhanging portions disposed laterally on opposite sides of the first overhanging portion and spaced substantially therefrom rearwardly of the tooth body, said overhanging portions all facing forwardly and generally toward the seat or the plane thereof with their faces sloping rearwardly toward the seat to receive and wedge against the seat a replaceable point complementally shaped, and a replaceable point restrained by the seat and spaced overhanging portions and secured in place by welding along the face of the seat and the sides of the point, the point being exposed at the sides thereof adjacent the seat along substantially the full length of the legs, and being of a different width than the seat to provide an angular space for welding.

2. A tooth for excavating implements or the like including a tooth body having a seat thereon to receive a replaceable point, an overhanging portion centrally disposed laterally of said seat, and a pair of additional overhanging portions disposed laterally on opposite sides of the first overhanging portion and spaced substantially therefrom rearwardly of the tooth body, said overhanging portions all facing forwardly and generally toward the seat or the plane thereof with their faces sloping rearwardly toward the seat to receive and wedge against the seat a replaceable point complementally shaped, and a replaceable point restrained by the seat and spaced overhanging portions and secured in place by welding along the face of the seat and the sides of the point, the point being exposed at the sides thereof adjacent the seat along substantially the full length of the legs, and being of a different width than the seat and the weld extending between the point and the seat to resist any flexing of the point away from the overhanging portions.

3. A tooth for excavating implements and the like including a body portion having a tooth seat thereon, the sides of which slope downwardly and outwardly, and having a forward cleat and cleats positioned laterally on each side thereof and substantially spaced rearwardly therefrom, all of said cleats facing partially, forwardly, and toward the seat, a replacement point interfittingly shaped to be wedged between the cleats and the seat, and means for holding it in place.

4. A replacement point for teeth of excavating implements and the like, including a front portion, spaced legs extending rearwardly therefrom integral with the front portion and separated by a slot, the base of the slot and the ends of the legs sloping rearwardly toward one face of the point, said face having its side portions sloping in a direction to partially face one another whereby if the side portions are cut from the point, a point of narrower width and thinner along its edges will be provided, and the ends of said legs sloping rearwardly and outwardly whereby the length of the legs will be reduced by said cutting.

5. A replacement point for teeth of excavating implements and the like, including a front portion, spaced legs extending rearwardly therefrom integral with the front portion and separated by a slot, the base of the slot and the ends of the legs sloping rearwardly toward one face of the point, said face having its side portions sloping in a direction to partially face one another whereby if the side portions are cut from the point, a point of narrower width and thinner along its edges will be provided.

6. A replacement point for teeth of excavating implements and the like, including a front portion, spaced legs extending rearwardly therefrom integral with the front portion and separated by a slot, the base of the slot and the ends of the point, said face having a transversely concave curvature whereby if the side portions are cut from the point, a point of narrower width and thinner along its edges will be provided.

7. A tooth for excavating implements or the like including a tooth body having a seat thereon to receive a replaceable point, an overhanging portion centrally disposed laterally of said seat, and a pair of additional overhanging portions disposed laterally on opposite sides of the first overhanging portion and spaced substantially therefrom longitudinally of the tooth body, said overhanging portions all facing forwardly and generally toward the seat or the plane thereof with their faces sloping rearwardly toward the seat to receive and wedge against the seat a replaceable point complementally shaped, and said structure including interfitting surfaces sloping laterally away from an intermediate portion in directions to provide a transverse centering action effective upon final rearward movement of the point on the body.

8. A tooth for excavating implements or the like including a tooth body having a seat thereon to receive a replaceable point, an overhanging portion centrally disposed laterally of said seat, and a pair of additional overhanging portions disposed laterally on opposite sides of the first overhanging portions all facing forwardly and generally toward the seat or the plane thereof with their faces sloping rearwardly toward the seat to receive and wedge against the seat a replaceable point complementally shaped, and said structure including interfitting surfaces sloping laterally away from an intermediate portion in directions to provide a transverse centering action effective upon final rearward movement of the point on the body, the sides of the body opening laterally outwardly from said rearward overhanging portions and forwardly thereof to leave a complementally shaped point exposed along its sides substantially the full length thereof for welding.

9. A replacement point for teeth of excavating implements and the like, including a front portion, spaced legs extending rearwardly therefrom integral with the front portion and separated by a slot, the surfaces forming the base of the slot and the ends of the legs sloping rearwardly toward one face surface of the point whereby said surfaces form longitudinally wedging surfaces; said wedging surfaces including portions having opposed lateral slopes adapted to produce a lateral centering action as the point is wedged onto a complementally shaped base, and said legs continuing the contour of the tooth rearwardly substantially the full length of the legs on the sides thereof whereby when said point is carried by a complementally shaped tooth base said legs will be exposed along the length of their sides for welding to the base along the bottom of the legs.

10. A replacement point for teeth of excavating implements and the like, including a front portion, spaced legs extending rearwardly therefrom integral with the front portion and separated by a slot, the surfaces forming the base of the slot and the ends of the legs sloping rearwardly toward one face surface of the point whereby said surfaces form longitudinally wedging surfaces, said legs continuing the contour of the tooth rearwardly substantially the full length of the legs on the sides thereof whereby when said point is carried by a complementally shaped tooth base said legs will be exposed along the length of the sides for welding to the base along the bottom of the legs.

11. A tooth for excavating implements or the like including a tooth body having a seat thereon to receive a replaceable point, an overhanging portion centrally disposed laterally of said seat, and a pair of additional overhanging portions disposed laterally on opposite sides of the first overhanging portion and spaced substantially therefrom rearwardly of the tooth body, said overhanging portions all facing forwardly and generally toward the seat or the plane thereof with their faces sloping rearwardly toward the seat to receive and wedge against the seat a replaceable point complementally shaped, and a replaceable point restrained by the seat and spaced overhanging portions and secured in place by welding along the seat and the sides of the point, the point being exposed at the sides thereof adjacent the seat along substantially the full length of the legs.

ARTHUR W. DANIELS.
JOSEPH P. MURTAUGH.

REFERENCES CITED

The following references are of record in the file of this patent:

UNITED STATES PATENTS

| Number | Name | Date |
|---|---|---|
| 1,902,513 | Meutsch | Mar. 21, 1933 |
| 1,544,222 | Crosby | June 30, 1925 |
| 2,113,420 | Younie | Apr. 5, 1938 |
| 2,369,285 | Daniels et al. | Feb. 13, 1945 |

FOREIGN PATENTS

| Number | Country | Date |
|---|---|---|
| 421,899 | British | Jan. 2, 1935 |